US00RE48080E

(19) United States
(12) Reissued Patent
Cho et al.

(10) Patent Number: US RE48,080 E
(45) Date of Reissued Patent: Jul. 7, 2020

(54) INDOOR UNIT OF AIR CONDITIONER AND METHOD OF CONNECTING REFRIGERANT PIPE THEREOF

(71) Applicant: Samsung Electronics Co., Ltd., Suwon-si (KR)

(72) Inventors: Sung June Cho, Suwon-si (KR); Jee Ho Park, Yongin-si (KR); Hyun Dal Kim, Suwon-si (KR)

(73) Assignee: SAMSUNG ELECTRONICS CO., LTD., Suwon-si (KR)

(21) Appl. No.: 15/843,519

(22) Filed: Dec. 15, 2017

Related U.S. Patent Documents

Reissue of:
(64) Patent No.: 9,618,217
Issued: Apr. 11, 2017
Appl. No.: 14/734,613
Filed: Jun. 9, 2015

U.S. Applications:
(63) Continuation of application No. 14/328,205, filed on Jul. 10, 2014, now Pat. No. 9,222,684.

(30) Foreign Application Priority Data

Jul. 23, 2013 (KR) ..... 10-2013-0086632

(51) Int. Cl.
*F25B 13/00* (2006.01)
*F25D 23/02* (2006.01)
(Continued)

(52) U.S. Cl.
CPC ..... *F24F 1/26* (2013.01); *F24F 1/0007* (2013.01); *F24F 13/30* (2013.01); *F24F 13/32* (2013.01); *Y10T 29/4935* (2015.01)

(58) Field of Classification Search
CPC .. F24F 1/26; F24F 1/0007; F24F 13/30; F24F 13/32; Y10T 29/4935; F25B 13/00;
(Continued)

(56) References Cited

U.S. PATENT DOCUMENTS 3,519,069 A 7/1970 Green
6,244,954 B1 * 6/2001 Hosokawa ..... F24F 1/0007 454/315

(Continued)

FOREIGN PATENT DOCUMENTS

CN 1287255 3/2001
CN 1357712 7/2002

(Continued)

OTHER PUBLICATIONS

Chinese Office Action dated Feb. 26, 2018 in Chinese Patent Application No. 201480042022.2.

(Continued)

*Primary Examiner* — Joseph A Kaufman
(74) *Attorney, Agent, or Firm* — Staas & Halsey LLP

(57) ABSTRACT

An indoor unit of an air conditioner includes a frame of the indoor unit; a heat exchanger mounted on the frame and having a refrigerant pipe in which a refrigerant flows; a hanger plate mounted on a rear surface of the frame and configured to fix the frame onto a wall surface; and a holder plate mounted on a lower portion of the frame and connecting the frame and the hanger plate. An end of the refrigerant pipe is placed in a space formed by the frame, the holder plate, and the hanger plate. The holder plate is movably connected on a lower portion of the frame, so the refrigerant pipe is accessible to a user to perform an operation of connecting or separating the refrigerant pipe to or from a connection pipe connected to an outdoor unit without rotating the frame.

22 Claims, 8 Drawing Sheets

(51) Int. Cl.

| | |
|---|---|
| ***F25D 23/10*** | (2006.01) |
| ***F24F 13/32*** | (2006.01) |
| ***F24F 1/26*** | (2011.01) |
| ***F24F 1/00*** | (2019.01) |
| ***F24F 13/30*** | (2006.01) |
| ***F24F 1/0007*** | (2019.01) |

(58) Field of Classification Search
CPC ..... F25D 23/10; F25D 23/025; F25D 23/028; F25D 2323/024
See application file for complete search history.

(56) References Cited

U.S. PATENT DOCUMENTS

| | | | | |
|---|---|---|---|---|
| 6,606,876 | B1 | 8/2003 | Giordano | |
| 2001/0027661 | A1* | 10/2001 | Nishikawa | F24F 1/0007 62/259.1 |
| 2002/0029579 | A1* | 3/2002 | Sohn | F24F 1/0003 62/285 |
| 2006/0272129 | A1 | 12/2006 | Rude et al. | |
| 2007/0245757 | A1* | 10/2007 | Inoue | F24F 1/0007 62/259.1 |
| 2011/0048050 | A1 | 3/2011 | Moteki et al. | |
| 2012/0135674 | A1* | 5/2012 | Uehara | F24F 1/0007 454/338 |
| 2012/0318005 | A1* | 12/2012 | Lingrey | F24F 1/20 62/77 |
| 2015/0040602 | A1* | 2/2015 | Park | F24F 1/0007 62/291 |
| 2016/0025357 | A1* | 1/2016 | Suzuki | F24F 13/20 165/121 |
| 2016/0033161 | A1* | 2/2016 | Koyanagi | F24F 1/0007 312/236 |
| 2017/0131208 | A1* | 5/2017 | Kim | F24F 1/0007 |
| 2018/0080668 | A1* | 3/2018 | Booten | F16L 5/10 |

FOREIGN PATENT DOCUMENTS

| | | | |
|---|---|---|---|
| CN | 100504193 | | 6/2009 |
| CN | 101737938 | | 6/2010 |
| CN | 102042667 | | 5/2011 |
| CN | 102679464 | | 9/2012 |
| EP | 1 795 821 | | 6/2007 |
| EP | 1795821 | | 6/2007 |
| JP | 58-76015 | | 5/1983 |
| JP | 58-102034 | | 6/1983 |
| JP | 64-28429 | | 1/1989 |
| JP | 5-172359 | | 7/1993 |
| JP | 7-324770 | | 12/1995 |
| JP | H0960964 | | 3/1997 |
| JP | 09060964 | A * | 4/1997 |
| JP | 002854220 | B2 * | 1/1999 |
| JP | 11-182887 | | 7/1999 |
| JP | 2006-145049 | | 6/2006 |
| JP | 2006145049 | A * | 6/2006 |
| KR | 0111167 | | 1/1994 |
| KR | 20-0111167 | | 4/1998 |
| KR | 10-2010-0052385 | | 5/2010 |
| WO | 2006/132772 | | 12/2006 |

OTHER PUBLICATIONS

Russian Office Action dated Mar. 9, 2017 in Russian Patent Application No. 2016102015.
Russian Decision on Grant dated Oct. 9, 2017 in Russian Patent Application No. 2016102015.
Australian Notice of Acceptance dated Mar. 3, 2017 in Australian Patent Application No. 2014293844.
European Office Action dated Feb. 18, 2019 in European Patent Application No. 14829628.8.
Chinese Office Action dated Apr. 16, 2019 in Chinese Patent Application No. 201480042022.2.
Chinese Office Action dated Sep. 30, 2018 in Chinese Patent Application No. 201480042022.2.
Russian Notice of Allowance dated Oct. 8, 2018 in Russian Patent Application No. 2018102101/12(002770).
Chinese Office Action dated Oct. 29, 2019 in Chinese Patent Application No. 201810149554.6.
Indian Office Action dated Nov. 29, 2019 in Indian Patent Application No. 201617004723.
Brazilian Communication dated Apr. 7, 2020 in Brazilian Patent Application No. BR112015032474-6.
European Communication dated Feb. 18, 2020 in European Patent Application No. 14829628.8.
Korean Notice of Allowance issued Sep. 14, 2015 in corresponding Korean Patent Application No. 10-2013-0086632.
U.S. Office Action issued Sep. 22, 2014 in copending U.S. Appl. No. 14/328,205.
U.S. Office Action issued Apr. 10, 2015 in copending U.S. Appl. No. 14/328,205.
International Search Report issued Aug. 14, in corresponding International Patent Application No. PCT/KR2014/006695.
U.S. Appl. No. 14/328,205, filed Jul. 10, 2014, Sung June Cho, Samsung Electronics Co., Ltd.
U.S. Notice of Allowance issued Jul. 16, 2015 in copending U.S. Appl. No. 14/328,205.
Extended European Search Report dated Dec. 19, 2016 from European Patent Application No. 14829628.8, 6 pages.

* cited by examiner

INDOOR UNIT OF AIR CONDITIONER AND METHOD OF CONNECTING REFRIGERANT PIPE THEREOF

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application *is a broadening reissue application of U.S. Pat. No. 9,618,217, issued on Apr. 11, 2017, which* is a continuation of U.S. application Ser. No. 14/328,205 filed on Jul. 10, 2014, which claims the benefit of Korean Patent Application No. 10-2013-0086632, filed on Jul. 23, 2013 in the Korean Intellectual Property Office, the disclosures of which are incorporated herein by reference.

BACKGROUND

1. Field

Embodiments of the present disclosure relate to an indoor unit of an air conditioner having an improved frame structure in which a refrigerant pipe that connects an outdoor unit and the indoor unit can be easily connected, and a method of connecting the refrigerant pipe of the indoor unit of the air conditioner.

2. Description of the Related Art

Air conditioners, which are apparatuses that keep indoor air fresh and suitable for activities of humans using a refrigeration cycle, cool an interior by performing a repeated operation of inhaling indoor hot air, exchanging heat with a low-temperature refrigerant, and then ejecting the heat-exchanged air indoors, or heat the interior by performing a reverse operation of the above-mentioned operation.

Air conditioners may cool or heat the interior using a cooling cycle in which a compressor, a condenser, an expansion valve, and an evaporator are circulated forward or backward. The compressor provides a refrigerant in a high-temperature high-pressure gaseous state, and the condenser provides a refrigerant in a room-temperature high-pressure liquid state. The expansion valve decompresses refrigerant the room-temperature high-pressure liquid state, and the evaporator evaporates the decompressed refrigerant into a low-temperature gaseous state.

An air conditioner may be classified as a separable air conditioner in which an outdoor unit and an indoor unit are separately installed, or an integrally formed air conditioner in which the outdoor unit and the indoor unit are integrally installed. In the separable air conditioner in which the outdoor unit and the indoor unit are separately installed, in general, a compressor and a condenser (outdoor heat exchanger) are provided at the outdoor unit, and an evaporator (indoor heat exchanger) is provided at the indoor unit. A refrigerant may flow while circulating the outdoor unit and the indoor unit via a pipe that connects the indoor unit and the outdoor unit.

The air conditioner may also be classified as a stand type air conditioner, a wall-mountable air conditioner, or a ceiling type air conditioner according to an installation method of the indoor unit. In the wall-mountable air conditioner of the separable air conditioner in which the indoor unit and the outdoor unit are separately installed, the indoor unit may be installed at a wall surface of the interior, and the indoor unit may be connected to the outdoor unit installed outdoors via a connection pipe. That is, a refrigerant pipe provided at the indoor unit may be connected to the refrigerant pipe provided at the outdoor unit via the connection pipe, and the refrigerant may circulate the refrigerant pipes provided at the indoor unit and the outdoor unit.

Before the air conditioner is installed, the indoor unit and the outdoor unit may be separately provided, and when the air conditioner is installed, the indoor unit and the outdoor unit may be connected to each other via a pipe. In the separable wall-mountable air conditioner, a holder plate may be provided at a lower end of the air conditioner so as to be stably fixed onto the wall surface. A fixing bracket may be mounted on the wall surface on which the indoor unit of the wall-mountable air conditioner is to be mounted, and the holder plate may be mounted to the fixing bracket so that the wall-mountable air conditioner can be stably fixed onto the wall surface.

The refrigerant pipe provided at the indoor unit may be provided at a rear lower end of the indoor unit so that the refrigerant is not exposed to the outside for the reason of aesthetic appeal of the interior in which the wall-mountable air conditioner is installed. In the wall-mountable air conditioner according to the related art, the holder plate is provided at the lower end of the indoor unit, and thus no working space in which an end of the refrigerant pipe of the indoor unit and the connection pipe are to be connected to each other or to be separated from each other when the indoor unit is installed or disassembled may be secured, and it may be difficult to perform an operation of connecting or separating the refrigerant pipe of the indoor unit to or from the connection pipe.

SUMMARY

Therefore, it is an aspect of the present disclosure to provide an indoor unit of an air conditioner having an improved frame structure in which a refrigerant pipe of the indoor unit and a connection pipe can be easily connected to each other when the indoor unit of a wall-mountable air conditioner is installed at a wall surface or the refrigerant pipe of the indoor unit and the connection pipe can be easily separated from each other when the indoor unit of the wall-mountable air conditioner is removed from the wall surface.

Additional aspects of the disclosure will be set forth in part in the description which follows and, in part, will be apparent from the description, or may be learned by practice of the disclosure.

In accordance with one aspect of the present disclosure, there is provided an indoor unit of an air conditioner including: a frame; a heat exchanger mounted on the frame and having a refrigerant pipe in which a refrigerant flows; a hanger plate mounted on a rear surface of the frame and fixing the frame onto a wall surface; and a holder plate mounted on a lower portion of the frame, fixing the frame and the hanger plate, and supported by a fixing member of the wall surface, wherein the holder plate may selectively open/close the lower portion of the frame so as to facilitate pipe connection.

The holder plate may be detachably mounted on the frame.

An insertion portion may be formed on the frame, and the holder plate may slide into and be inserted into the insertion portion.

An interference portion may be formed to protrude at one side of the insertion portion, an interference hole may be formed in the holder plate, and when the holder plate is inserted into the insertion portion, the interference portion may be inserted into the interference hole so that the holder plate can be fixed to the frame in a state in which the holder plate is inserted into the insertion portion.

A protrusion rib may be formed at an inner side of the insertion portion and may guide movement of the holder plate.

A guide portion may be formed on the holder plate, and the guide portion may be guided by the protrusion rib and may guide the holder plate to be inserted into the insertion portion or to be taken out from the insertion portion.

An interference portion may be formed at one side of the insertion portion so as to prevent the holder plate from being separated from the frame.

A hole may be provided in a rear surface of the hanger plate, and a fixing member mounted onto the wall surface may be inserted into the hole so that the hanger plate can be fixed onto the wall surface.

One end of the hanger plate may be mounted on the frame, and an extension portion that protrudes toward the frame may be formed at the other end of the hanger plate.

A hole may be formed in the extension portion, and a protrusion portion may be formed at one side of the holder plate, and the protrusion portion may be inserted into the hole so that the frame and the other end of the hanger plate can be fixed by the holder frame.

The holder plate may be mounted on the frame with a hinge, and the holder plate may be rotated about the hinge so as to selectively open/close the lower portion of the frame.

An extension portion that protrudes toward the frame may be formed on the hanger plate, and one side of the holder plate may be mounted on the extension portion.

A hole may be formed in one side of the extension portion, and a protrusion portion formed at one side of the holder plate may be inserted into the hole so that the holder plate can be fixed to the hanger plate.

A protrusion portion may be formed at one side of the holder plate, and the protrusion portion may be inserted into the hole.

The holder plate may slide and may be separable from the frame.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

The present disclosure will now be described more fully with reference to the accompanying drawings, in which exemplary embodiments of the disclosure are shown.

Figure 1:
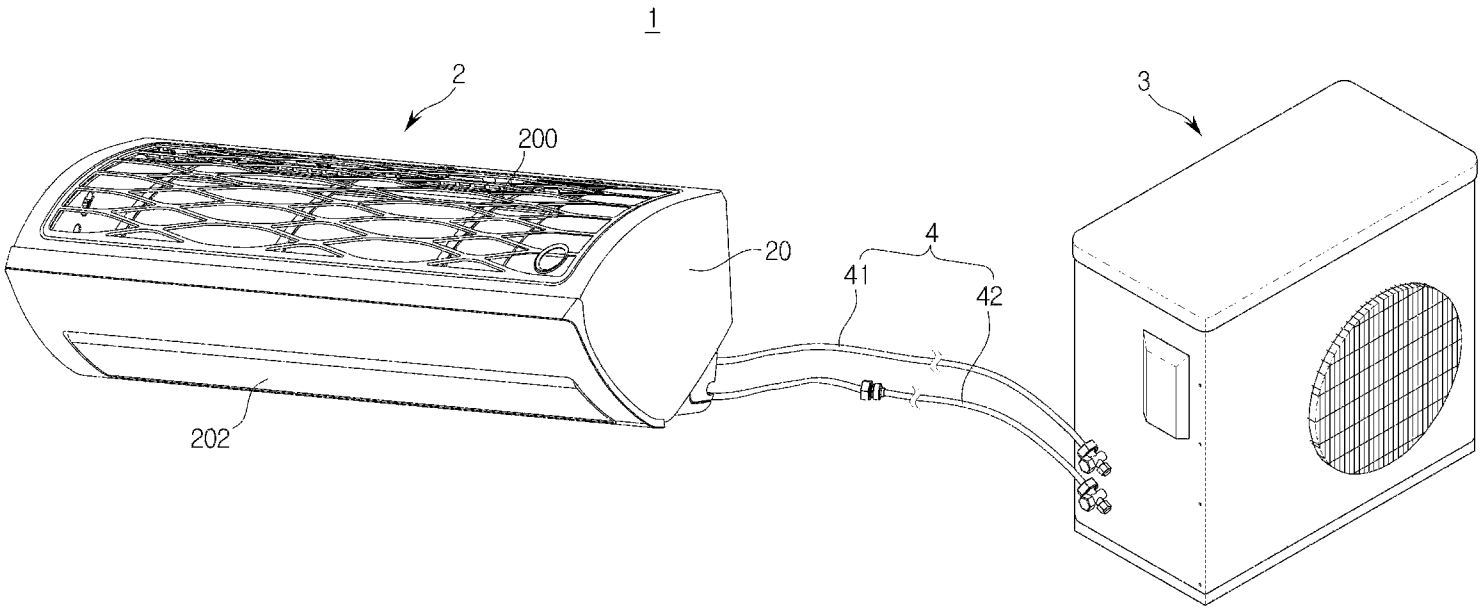
FIG. 1 illustrates an air conditioner according to an embodiment of the present disclosure.

FIG. 1 illustrates an air conditioner according to an embodiment of the present disclosure.

Referring to FIG. 1, an air conditioner 1 according to an embodiment of the present disclosure includes an indoor unit 2, an outdoor unit 3, and a connection pipe 4 that connects the indoor unit 2 and the outdoor unit 3. A refrigerant may circulate through a refrigerant pipe (see 240 of FIG. 2) provided at the indoor unit 2 and a refrigerant pipe (not shown) provided at the outdoor unit 3 via the connection pipe 4.

The indoor unit 2 may keep an appropriate indoor temperature by discharging air that exchanges heat with the refrigerant that is compressed and condensed in the outdoor unit 3 indoors. The indoor unit 2 may include an expansion valve and an evaporator. Indoor air may be cooled by the refrigerant evaporated by the evaporator.

The outdoor unit 3 may include a compressor, a condenser, and a blower fan. An air inhalation hole, through which external air may be introduced or discharged, may be formed in one side of the outdoor unit 3. The compressor compresses the refrigerant, and the compressed refrigerant is introduced into the condenser and condensed. In this case, the blower fan may be driven, and external air that is introduced through the air inhalation hole may cool heat generated in the condenser.

Based on a cooling operation, the connection pipe 4 includes a first connection pipe 41 in which the refrigerant moves from the outdoor unit 3 to the indoor unit 2, and a second connection pipe 42 in which the refrigerant moves from the indoor unit 2 to the outdoor unit 3. Circulation of the refrigerant may be performed in such a way that the refrigerant is introduced into the indoor unit 2 from the outdoor unit 3 via the first connection pipe 41 and the refrigerant is introduced into the outdoor unit 3 from the indoor unit 2 to the outdoor unit 3 via the second connection pipe 42.

When the air conditioner 1 operates so as to cool indoor air to a predetermined temperature or less, the compressor provided at the outdoor unit 3 compresses the refrigerant to a high temperature and a high pressure, and the compressed refrigerant moves to the condenser. The high-temperature high-pressure refrigerant is condensed into a low-temperature high-pressure refrigerant by the condenser and moves to the first connection pipe 41. The refrigerant moves along the first connection pipe 41 and is introduced into the indoor unit 2. The refrigerant that is expanded by the expansion valve provided at the outdoor unit 3 or the indoor unit 2 may be evaporated by the evaporator and may exchange heat with high-temperature indoor air so that cooling can be performed. The heat-exchanged refrigerant may move along the second connection pipe 42 and may be introduced into the outdoor unit 3.

Figure 2:
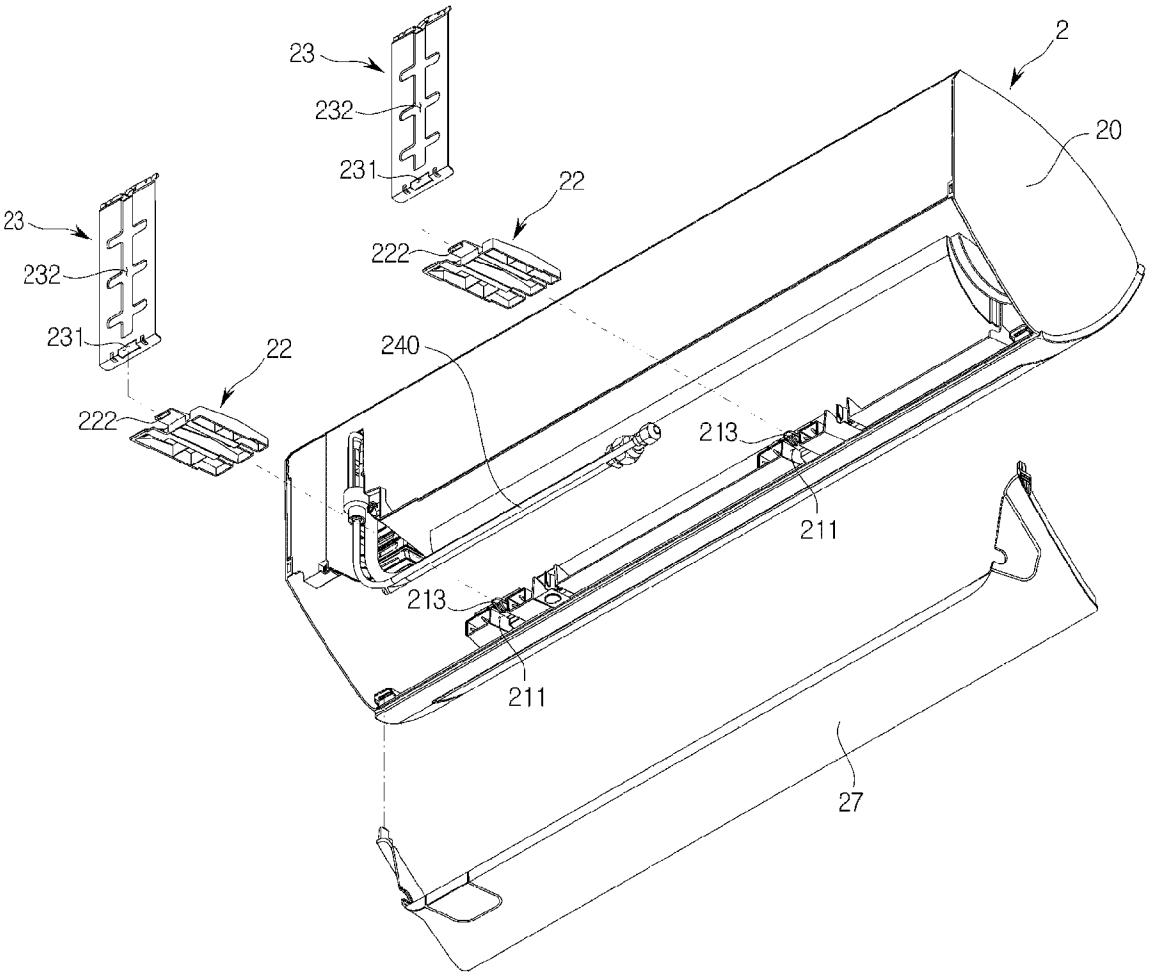
FIG. 2 is an exploded perspective view of an indoor unit of the air conditioner illustrated in FIG. 1 from a rear direction.
Figure 3:
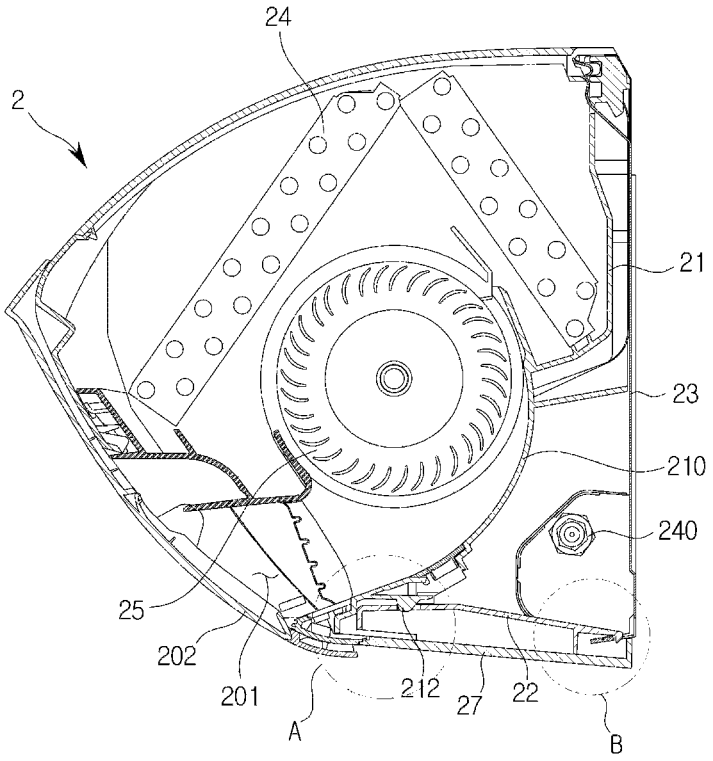
FIG. 3 illustrates an internal configuration of a side of the air conditioner of FIG. 1.
Figure 4:
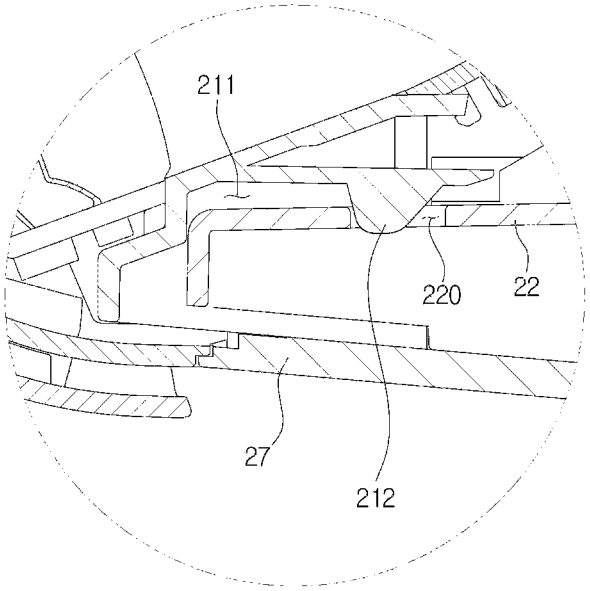
FIG. 4 is an enlarged view of a portion A of FIG. 3.
Figure 5:
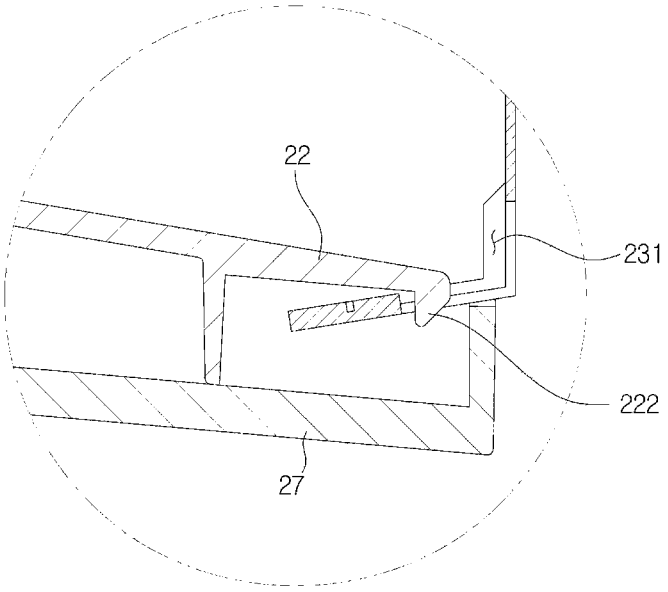
FIG. 5 is an enlarged view of a portion B of FIG. 3.
Figure 6:
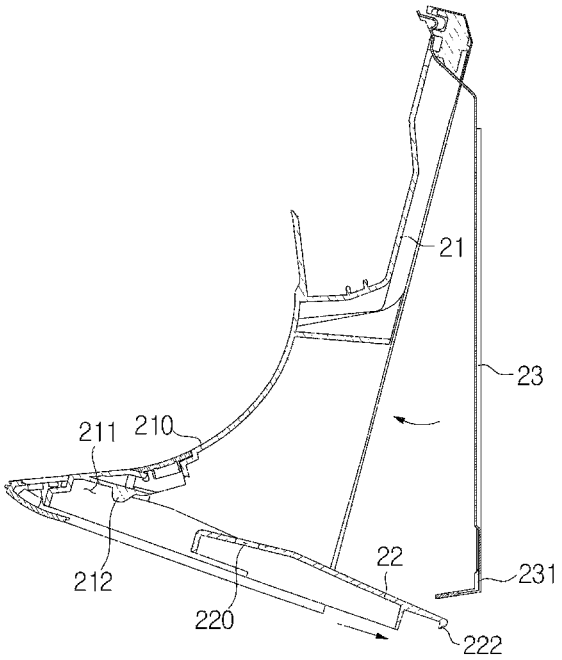
FIG. 6 illustrates a state in which a holder plate is separated from a frame according to an embodiment of the present disclosure.

FIG. 2 is an exploded perspective view of an indoor unit of the air conditioner illustrated in FIG. 1 from a rear direction, FIG. 3 illustrates an internal configuration of a side of the air conditioner of FIG. 1, FIG. 4 is an enlarged view of a portion A of FIG. 3, FIG. 5 is an enlarged view of a portion B of FIG. 3, and FIG. 6 illustrates a state in which a holder plate is separated from a frame according to an embodiment of the present disclosure.

Referring to FIGS. 1 through 6, the indoor unit 2 of the air conditioner 1 illustrated in FIG. 1 includes a case 20, a frame 21, a heat exchanger 24, and a blower fan 25. The frame 21, the heat exchanger 24, and the blower fan 25 may be accommodated in the case 20.

A grill 200 may be formed on a front surface of the case 20 so that external air can be inhaled into the indoor unit 2. An air ejection hole 201, through which air that is heat-exchanged by the heat exchanger 24 is ejected into an indoor space, may be formed in a lower portion of the case 20. A blade 202 may be mounted on the lower portion of the case 20. The air ejection hole 201 may be opened/closed with the blade 202, and a direction in which air is ejected through the air ejection hole 201 may be adjusted with the blade 202. The air ejection hole 201 may be formed longitudinally in a horizontal direction at a lower side of the case 20, and the blade 202 may be installed to correspond to the air ejection hole 201.

A frame 21 may be provided in the case 20. The blower fan 25 may be coupled to the frame 21. The blower fan 25 is provided in the case 20 and generates an inhalation force for inhaling indoor air.

The heat exchanger 24 may be provided in the case 20. Indoor air that is inhaled into the case 20 with the blower fan 25 may be cooled or heated by the heat exchanger 24. In detail, when the blower fan 25 is rotated, air inhaled into the case 20 via the grill 200 may pass through the heat exchanger 24 and may be cooled or heated and then may be guided toward the air ejection hole 201 with a rear guide 210 and may be discharged indoors through the air ejection hole 201.

In this case, an ejection direction of discharged air may be adjusted by the blade 202. The blade 202 may be installed to correspond to the air ejection hole 201 that is formed long in the horizontal direction at the lower side of the case 20 and may have a shape of a long width. The blade 202 may be rotated and may sag downward so as to open the air ejection hole 201.

A refrigerant pipe 240 provided at the heat exchanger 24 may extend in a backward direction of the frame 21. An end of the refrigerant pipe 240 connected to the heat exchanger 24 of the indoor unit 2 is provided to be open in the backward direction of the frame 21. The connection pipe 4 may be connected to the end of the refrigerant pipe 240 provided to be open in the backward direction of the frame 21. The refrigerant pipe 240 of the indoor unit 2 and the refrigerant pipe (not shown) of the outdoor unit 3 may be connected to each other via the connection pipe 4. Thus, the refrigerant may circulate the refrigerant pipe 240 of the indoor unit 2, the connection pipe 4, and the refrigerant pipe of the outdoor unit 3.

In order to prevent the refrigerant pipe 240 from being damaged by pressure of the refrigerant that flows within the refrigerant pipe 240, the refrigerant pipe 240 of the indoor unit 2 may be manufactured of aluminum or copper. Since the refrigerant pipe 240 of the indoor unit 2 is formed of a hard material, such as aluminum or copper, the refrigerant pipe 240 does not bend or extend. Thus, in an air conditioner according to the related art, in order to connect a refrigerant pipe and a connection pipe after an indoor unit is installed at a wall surface, an additional separation member or other things in a house may be placed between a rear surface of the indoor unit and the wall surface so that the rear surface of the indoor unit can be spaced apart from the wall surface by a predetermined distance, thereby securing working space in which the connection pipe may be connected to the end of the refrigerant pipe of the indoor unit. In this case, when something placed between the indoor unit and the wall surface moves during work or is released from the space between the indoor unit and the wall surface, a disturbance in an operation of connecting the refrigerant pipe is created, and an accident in which the indoor unit is damaged occurs.

Hereinafter, a structure of the frame 21 in which working space can be secured between the rear surface of the indoor unit 2 and the wall surface after the indoor unit 2 is installed at the wall surface will be described in detail with reference to the drawings.

A holder plate 22 and a hanger plate 23 may be mounted on the frame 21 of the indoor unit 2 illustrated in FIG. 1. A lower cover 27 may be mounted on the frame 21 placed at a lower portion of the holder plate 22. A lower portion of the indoor unit 2 may be covered by the lower cover 27. The end of the refrigerant pipe 240 may be placed at a rear side of the frame 21. In detail, the end of the refrigerant pipe 240 may be placed in a space formed by the frame 21, the holder plate 22, and the hanger plate 23.

The hanger plate 23 may be coupled onto a rear surface of the frame 21. The hanger plate 23 may be coupled onto the rear surface of the frame 21 and may fix the indoor unit 2 onto the wall surface. For example, a fixing hole 232, through which a fixing unit (not shown) that protrudes toward the wall surface may be inserted, is provided in the hanger plate 23, and the fixing unit (not shown) on the wall surface may be inserted into the fixing hole 232 provided in the hanger plate 23 so that the indoor unit 2 can be fixed onto the wall surface.

One end of the hanger plate 23 may be coupled to one side of a rear surface of the frame 21 and may be fixed thereto. An extension portion 230 may be formed at the other end of the hanger plate 23. The extension portion 230 may be formed to extend toward the frame 21 in a state in which the hanger plate 23 is coupled onto the rear surface of the frame 21. A hole 231 may be formed in one side of the extension portion 230. A protrusion portion 222 formed on the holder plate 22 may be inserted into the hole 231. The protrusion portion 222 formed on the holder plate 22 may be inserted into the hole 231 of the hanger plate 23 and may be interfered with by an interference portion 212 so that the holder plate 22 can fix the hanger plate 23 and the frame 21.

The holder plate 22 may be mounted on a bottom surface of the frame 21. The holder plate 22 may be mounted on the bottom surface of the frame 21 and may be supported by a support member provided on the wall surface. The bottom surface of the indoor unit 2 is supported by the support member mounted on the wall surface so that the indoor unit 2 can be more stably fixed onto the wall surface. The lower cover 27 may be provided at the lower portion of the holder plate 22 so as to cover the holder plate 22 not to be exposed to an outer side of the indoor unit 2.

An insertion portion 211, into which the holder plate 22 may be inserted and may slide, may be formed on the bottom surface of the frame 21. The insertion portion 211 may be formed to correspond to a shape of the holder plate 22. A protrusion rib 213 may be formed at one side of the insertion portion 211 and may extend long in a direction in which the holder plate 22 is inserted into the insertion portion 211. The holder plate 22 may be guided by the protrusion rib 213 and may slide into and be inserted into the insertion portion 211. A guide portion corresponding to the protrusion rib 213 may also be formed on the holder plate 22. When the holder plate 22 slides into the insertion portion 211, the guide portion may be provided in a shape of a groove or hole that extends long along a sliding direction, the protrusion rib 213 may be guided along the guide portion, and the holder plate 22 may slide into and be inserted into the insertion portion 211.

The interference portion 212 may protrude and may be formed at one side of the insertion portion 211 so that the holder plate 22 does not move within the insertion portion 211. An interference hole 220, through which the interference portion 212 may pass in a state in which the holder plate 22 is inserted into the insertion portion 211 and the interference portion 212 may be exposed to the outside, may be formed in the holder plate 22. In detail, when the holder plate 22 is fully inserted into the insertion portion 211, the interference portion 212 may be inserted into the interference hole 220 so that the holder plate 22 can be fixed to the frame 21.

In order to allow the interference portion 212 formed on the bottom surface of the frame 21 to escape from the interference hole 220 formed in the holder plate 22, the holder plate 22 may be rotated at a predetermined angle in an opposite direction to a direction in which the frame 21 is placed, and may slide and thus be separated from the frame 21 and the hanger plate 23. Thus, the lower portion of the frame 21 may be in an open state.

When the refrigerant pipe 240 of the indoor unit 2 and the connection pipe 4 are connected to each other in a state in which the indoor unit 2 is installed at the wall surface or when the refrigerant pipe 240 of the indoor unit 2 and the connection pipe 4 are separated from each other so as to remove the indoor unit 2 from the wall surface, as described above, the holder plate 22 may be rotated at a predetermined angle and may slide and be separated from the frame 21 and the hanger plate 23 so that a lower space of the frame 21 can be opened and the working space can be secured. The holder plate 22 is detachably mounted on the frame 21 so that the working space can be easily secured when the refrigerant pipe 240 of the indoor unit 2 and the connection pipe 4 are connected to or separated from each other.

When the indoor unit 2 is installed at the wall surface, a worker first fixes the indoor unit 2 onto the wall surface. In this case, the fixing unit (not shown) that protrudes toward the wall surface may be inserted into the fixing hole 232 formed in the hanger plate 23, and the holder plate 22 may be supported by the support member (not shown) provided on the wall surface. The worker may raise a lower end of the indoor unit 2 fixed onto the wall surface and then cause the holder plate 22 to slide and be separated from the frame 21 and the hanger plate 23, so as to connect the refrigerant pipe 240 of the indoor unit 2 and the connection pipe 4. In this case, the worker may cause the holder plate 22 to slide after the protrusion portion 222 escapes from the hole 231 by raising a rear portion of the holder plate 22 so that the protrusion portion 222 formed on the holder plate 22 can escape from the hole 231 formed in the hanger plate 23.

When the holder plate 22 is separated from a lower end of the indoor unit 2, sufficient working space in which the refrigerant pipe 240 of the indoor unit 2 and the connection pipe 4 may be connected to each other can be secured. The worker connects the refrigerant pipe 240 and the connection pipe 4, raises the lower end of the indoor unit 2, cause the holder plate 22 to slide so that the protrusion portion 222 provided on the holder plate 22 can be inserted into the hole 231 formed in the hanger plate 23, and mounts the holder plate 22 on the lower end of the indoor unit 2. The holder plate 22 mounted on the lower end of the indoor unit 2 may be supported by the support member (not shown) provided on the wall surface so that the indoor unit 2 can be more stably fixed onto the wall surface.

In order to move the indoor unit 2 to another place, the worker may raise the lower end of the indoor unit 2, raise the holder plate 22 slightly, cause the holder plate 22 to slide into the hole 231 after the protrusion portion 222 escapes from the hole 231, and separate the holder plate 22 from the hanger plate 23. The worker may perform an operation of separating the refrigerant pipe 240 of the indoor unit 2 from the connection pipe 4 in a state in which sufficient space required for an operation of separating the refrigerant pipe 240 from the connection pipe 4 is secured, and then may detach the indoor unit 2 from the wall surface.

Figure 7:
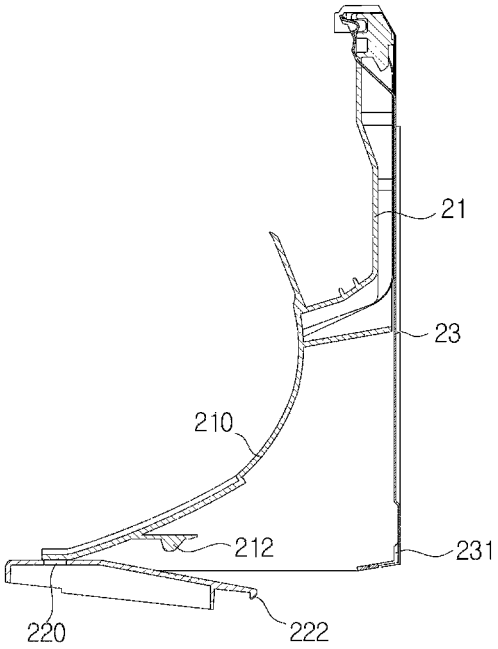
FIG. 7 illustrates a state in which the holder plate is slid toward a front of the frame according to another embodiment of the present disclosure.

FIG. 7 illustrates a state in which the holder plate is slid toward a front of the frame according to another embodiment of the present disclosure.

Referring to FIG. 7, the holder plate 22 according to another embodiment of the present disclosure may be slidably coupled to the frame 21. In detail, the holder plate 22 may be slidably mounted from the bottom surface of the frame 21 toward a front of the frame 21. The end of the refrigerant pipe 240 may be placed at the rear side of the frame 21. The hanger plate 23 may be mounted on the rear side of the frame 21, and the end of the refrigerant pipe 240 may be placed in a space in which the frame 21, the holder plate 22, and the hanger plate 23 are formed.

Similarly to FIG. 1, the holder plate 22 may slide into and be inserted into the insertion portion 211 of the frame 21. In this case, a front of the insertion portion 211 may be open, and the holder plate 22 may be taken out from the indoor unit 2 through the open front portion of the insertion portion 211.

The protrusion rib 213 may be formed on an inner side surface of the insertion portion 211 long in a direction in which the holder plate 22 slides, so as to guide movement of the holder plate 22. A guide portion corresponding to the protrusion rib 213 may be formed on the holder plate 22, and the guide portion can be guided by the protrusion rib 213.

An interference portion (not shown) may be formed to protrude at one side of the insertion portion 211 of the frame 21, and the protrusion portion 222 provided on the holder plate 22 may be interfered with by the interference portion (not shown) so that the holder plate 22 cannot be fully separated from the frame 21.

As described above, the holder plate 22 may slide into the front of the frame 21 so that the lower space of the frame 21 can be open and a space required to perform an operation of connecting or separating the refrigerant pipe 240 and the connection pipe 4 to or from each other can be secured.

When the operation of connecting or separating the refrigerant pipe 240 and the connection pipe 4 to or from each other is finished, the holder plate 22 may slide into the front of the frame 21 and may be inserted into the insertion portion 211. The holder plate 22 inserted into the insertion portion 211 may be supported by the support member provided on the wall surface. Thus, the indoor unit 2 of the air conditioner 1 can be stably fixed onto the wall surface.

Combination of the holder plate 22 and the hanger plate 23 may be performed similarly to the structure illustrated in FIG. 1. In detail, the hanger plate 23 may be coupled onto the rear surface of the frame 21, and one end of the hanger plate 23 may be coupled onto and fixed to one side of the rear surface of the frame 21. The extension portion 230 that extends to the frame 21, may be formed on the other end of the hanger plate 23. The hole 231 may be formed in an upper surface of the extension portion 230, and the protrusion portion 222 formed on the holder plate 22 may be inserted into the hole 231 of the hanger plate 23 and may be interfered with by the interference portion 212 so that the holder plate 22 can be fixed to the frame 21.

The operation of connecting or separating the refrigerant pipe 240 provided at the indoor unit 2 to which the holder plate 22 illustrated in FIG. 7 is coupled and the connection pipe 4 may be performed similarly to the structure of FIG. 1.

In detail, when the indoor unit 2 is installed at the wall surface, the worker fixes the indoor unit 2 onto the wall surface. In this case, the fixing unit (not shown) that protrudes toward the wall surface may be inserted into the fixing hole 232 formed in the hanger plate 23, and the holder plate 22 may be supported by the support member (not shown) provided on the wall surface. The worker may slide the holder plate 22 forward so as to connect the refrigerant pipe 240 of the indoor unit 2 and the connection pipe 4. In this case, the worker may cause the holder plate 22 to slide after the protrusion portion 222 escapes from the hole 231 by raising the rear portion of the holder plate 22 so that the protrusion portion 222 formed on the holder plate 22 can escape from the hole 231 formed in the hanger plate 23. When the holder plate 22 slides and the lower end of the indoor unit 2 is open, sufficient working space in which the refrigerant pipe 240 of the indoor unit 2 and the connection pipe 4 may be connected to each other can be secured. The worker connects the refrigerant pipe 240 and the connection pipe 4 to each other and then causes the holder plate 22 to slide, slightly raises the rear portion of the holder plate 22 and inserts the protrusion portion 222 provided on the holder plate 22 into the hole 231 formed in the hanger plate 23. Thus, the holder plate 22 mounted on the lower end of the indoor unit 2 may be supported by the support member (not shown) provided on the wall surface so that the indoor unit 2 can be more stably fixed onto the wall surface.

When the worker wants to move the indoor unit 2 to another place, the worker may cause the holder plate 22 to slide after the protrusion portion 222 escapes from the hole 231 by slightly raising the rear portion of the holder plate 22. Thus, the lower portion of the indoor unit 2 can be opened. The worker may detach the indoor unit 2 from the wall surface after performing the operation of separating the refrigerant pipe 240 of the indoor unit 2 and the connection pipe 4 from each other in a state in which space is sufficiently secured for the operation of separating the refrigerant pipe 240.

Figure 8:
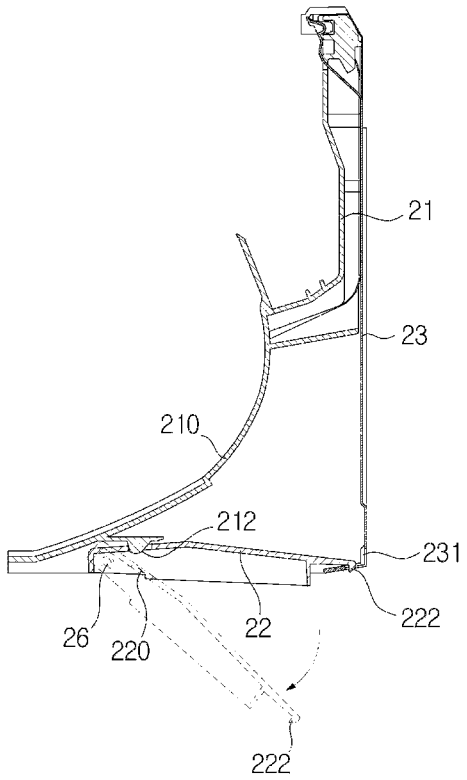
FIG. 8 illustrates a state in which the holder plate is hinge-coupled to the frame according to still another embodiment of the present disclosure.

FIG. 8 illustrates a state in which a holder plate is hinge-coupled to a frame according to still another embodiment of the present disclosure.

Referring to FIG. 8, the holder plate 22 according to still another embodiment of the present disclosure may be coupled to the frame 21 so as to be rotatable about a hinge 26. The holder plate 22 may be coupled onto the bottom surface of the frame 21 with the hinge 26. The holder plate 22 may be rotated about the hinge 26 so that the lower portion of the frame 21 can be opened/closed.

Combination of the holder plate 22 and the hanger plate 23 may be performed similarly to the structure of FIG. 1. In detail, the hanger plate 23 may be coupled onto the rear surface of the frame 21, and one end of the hanger plate 23 may be coupled to and fixed to one side of the rear surface of the frame 21. An extension portion 230 that extends to the frame 21 may be formed at the other end of the hanger plate 23. A hole 231 is formed in an upper surface of the extension portion 230, and the protrusion portion 222 formed on the holder plate 22 may be inserted into the hole 231 of the hanger plate 23 so that the holder plate 22 can be fixed to the frame 21.

The holder plate 22 may be supported by the support member provided on the wall surface so that the indoor unit 2 of the air conditioner 1 can be stably fixed onto the wall surface. When the indoor unit 2 is installed at or removed from the wall surface, the holder plate 22 may interfere with performing an operation of connecting or separating the connection pipe 4 to or from the refrigerant pipe of the indoor unit 2 so as to connect the refrigerant pipe 240 provided at the indoor unit 2 and the refrigerant pipe (not shown) of the outdoor unit 3, and a disturbance in the operation of connecting or separating the connection pipe 4 to or from the refrigerant pipe 240 of the indoor unit 2 may be created.

The operation of connecting or separating the refrigerant pipe 240 provided at the indoor unit 2 to which the holder plate 22 illustrated in FIG. 8 is coupled and the connection pipe may be performed similarly to that of FIG. 1.

In detail, when the indoor unit 2 is installed at the wall surface, the worker first fixes the indoor unit 2 onto the wall surface. In this case, the fixing unit (not shown) that protrudes toward the wall surface may be inserted into the fixing hole 232 formed in the hanger plate 23, and the holder plate 22 may be supported by the support member (not shown) provided on the wall surface. The worker may rotate the holder plate 22 about the hinge 26 so as to connect the refrigerant pipe 240 of the indoor unit 2 and the connection pipe 4. In this case, the worker may cause the protrusion portion 222 to escape from the hole 231 by raising a rear portion of the holder plate 22 so that the protrusion portion 222 formed on the holder plate 22 can escape from the hole 231 formed in the hanger plate 23, and may secure a space in which the holder plate 22 may be rotated by slightly raising the lower end of the indoor unit 2, and then rotate the holder plate 22 about the hinge 26. When the holder plate 22 is rotated and the lower end of the indoor unit 2 is open, sufficient working space in which the refrigerant pipe 240 of the indoor unit 2 and the connection pipe 4 may be connected to each other can be secured. The worker connects the refrigerant pipe 240 of the indoor unit 2 and the connection pipe 4 to each other and then rotates the holder plate 22 in an opposite direction to a direction in which the holder plate 22 is rotated when the holder plate 22 is open, raises the rear portion of the holder plate 22 slightly and inserts the protrusion portion 222 provided on the holder plate 22 into the hole 231 formed in the hanger plate 23. Thus, the holder plate 22 can be mounted on the lower end of the indoor unit 2. The holder plate 22 mounted on the lower end of the indoor unit 2 may be supported by the support member (not shown) provided on the wall surface so that the indoor unit 2 can be more stably fixed onto the wall surface.

When the worker wants to move the indoor unit 2 to another place, the worker may raise the rear portion of the holder plate 22 slightly and rotate the holder plate 22 after the protrusion portion 222 escapes from the hole 231. Thus, the lower portion of the indoor unit 2 can be opened. The worker may detach the indoor unit 2 from the wall surface after performing an operation of separating the refrigerant pipe 240 of the indoor unit 2 and the connection pipe 4 from each other in a state in which space is sufficiently secured for the operation of separating the refrigerant pipe 240.

According to the present disclosure, the holder plate 22 may be mounted to be separated from the frame 21 of the indoor unit 2, mounted on the frame 21 and may slide thereinto, or rotated about the hinge 26 so that a working space can be easily secured when the operation of connecting or separating the refrigerant pipe 240 of the indoor unit 2 and the connection pipe 4 to or from each other is performed. Thus, the indoor unit 2 can be easily installed at or removed from the wall surface without using an additional separation member, and sudden accidents that may occur in an unstable state in which the indoor unit 2 is separated by the separation member from the wall surface at a predetermined angle can be prevented in advance.

According to an embodiment of the present disclosure, working space and a field of vision required to connect or separate a refrigerant pipe provided at an indoor unit of a wall-mountable air conditioner and a connection pipe can be easily secured. The connection pipe can be connected to or separated from the refrigerant pipe provided at an indoor unit of a wall-mountable air conditioner in a state in which a sufficient field of vision is secured so that working convenience can be improved.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. An indoor unit of an air conditioner *connected to an outdoor unit of the air conditioner by a connection pipe*, the indoor unit comprising:

a frame of the indoor unit;

a heat exchanger mounted on the frame and having a refrigerant pipe in which a refrigerant flows;

a hanger plate mounted on a rear surface of the frame and configured to fix the frame onto a wall surface, the frame being rotatable with respect to the hanger plate; and a holder plate mounted on a lower portion of the frame and connecting the frame and the hanger plate, wherein *at least one of* an end of the refrigerant pipe *and an end of the connection pipe* is placed in a space formed by the frame, the holder plate, and the hanger plate, wherein the holder plate is configured to be detachable from the hanger plate, whereby the refrigerant pipe is accessible to a user to perform an operation of connecting or separating the refrigerant pipe to or from [a] *the* connection pipe connected to [an] *the* outdoor unit, and wherein an insertion portion is formed on the frame, and the holder plate is configured to be withdrawn from the insertion portion when the holder plate is detached from the hanger plate.

2. The indoor unit of claim 1, wherein the holder plate is detachably mounted on the frame.

3. The indoor unit of claim 1, wherein an interference portion is formed to protrude at one side of the insertion portion, an interference hole is formed in the holder plate, and when the holder plate is inserted into the insertion portion, the interference portion is inserted into the interference hole so that the holder plate is able to be fixed to the frame in a state in which the holder plate is inserted into the insertion portion.

4. The indoor unit of claim 1, wherein a protrusion rib is formed at an inner side of the insertion portion and guides movement of the holder plate.

5. The indoor unit of claim 4, wherein a guide portion is formed on the holder plate, and the guide portion is guided by the protrusion rib and guides the holder plate to be inserted into the insertion portion or to be taken out from the insertion portion.

6. The indoor unit of claim 1, wherein an interference portion is formed at one side of the insertion portion so as to prevent the holder plate from being separated from the frame.

7. The indoor unit of claim 1, wherein a hole is provided in a rear surface of the hanger plate, and a fixing member mounted onto the wall surface is inserted into the hole so that the hanger plate is able to be fixed onto the wall surface.

8. The indoor unit of claim 1, wherein one end of the hanger plate supports an upper side of the frame, and an extension portion that protrudes toward the frame is formed at the other end of the hanger plate.

9. The indoor unit of claim 8, wherein a hole is formed in the extension portion, and a protrusion portion is formed at one side of the holder plate, and the protrusion portion is inserted into the hole so that the frame and the other end of the hanger plate are able to be fixed by the holder frame.

10. The indoor unit of claim 1, wherein the holder plate is mounted on the frame with a hinge, and the holder plate is rotated about the hinge so as to selectively open/close the lower portion of the frame.

11. The indoor unit of claim 10, wherein an extension portion that protrudes toward the frame is formed on the hanger plate, and one side of the holder plate is mounted on the extension portion.

12. The indoor unit of claim 11, wherein a hole is formed in one side of the extension portion, and a part of the holder plate is inserted into the hole so that the holder plate is able to be fixed to the hanger plate.

13. The indoor unit of claim 1, wherein the holder plate slides and is separable from the frame.

14. The indoor unit of claim 12, wherein, after the protrusion portion formed on the holder plate escapes from the hole by raising a lower end of the indoor unit, the holder plate is able to slide.

15. The indoor unit of claim 10, wherein, after the protrusion portion formed on the holder plate escapes from the hole by raising a lower end of the indoor unit, the holder plate is able to be rotated.

16. An air conditioner, comprising:

an outdoor unit;

an indoor unit mounted flush to a wall;

a connection pipe to connect the outdoor unit and the indoor unit, wherein the indoor unit comprises a frame;

a heat exchanger mounted on the frame;

a refrigerant pipe mounted within the frame;

a hanger plate mounted on a rear surface of the frame and configured to fix the frame flush to the wall surface, the frame being rotatable with respect to the hanger plate; and a holder plate mounted on a lower portion of the frame to connect the frame and the hanger plate, the holder plate being detachably connected to the hanger plate, wherein an insertion portion is formed on the frame, and the holder plate is configured to be withdrawn from the insertion portion when the holder plate is detached from the hanger plate, and wherein *at least one of* an end of the refrigerant pipe *and an end of the connection pipe* is placed in a space formed by the frame, the holder plate and the hanger plate, whereby access to the refrigerant pipe by a user is provided when the holder plate is detached from the hanger plate.

17. The air conditioner of claim 16, wherein an interference portion is formed to protrude at one side of the insertion portion, an interference hole is formed in the holder plate, and when the holder plate is inserted into the insertion portion, the interference portion is inserted into the interference hole so that the holder plate is configured to be fixed to the frame in a state in which the holder plate is inserted into the insertion portion.

18. The air conditioner of claim 16, wherein a protrusion rib is formed at an inner side of the insertion portion and is configured to guide movement of the holder plate.

19. The air conditioner of claim 18, wherein a guide portion is formed on the holder plate, and the guide portion is guided by the protrusion rib and guides the holder plate to be inserted into the insertion portion or to be taken out from the insertion portion.

20. The air conditioner of claim 16, wherein a hole is provided in a rear surface of the hanger plate, and a fixing member configured to be mounted onto the wall is inserted into the hole so that the hanger plate is able to be fixed onto the wall.

21. The air conditioner of claim 16, wherein the holder plate is mounted on the frame with a hinge, and the holder plate is rotated about the hinge so as to selectively open/close the lower portion of the frame.

*22. The indoor unit of claim 1, further comprising: a lower cover covering a lower portion of the indoor unit and mounted on the frame placed at a lower portion of the holder plate.*

* * * * *